United States Patent [19]

Sattinger et al.

[11] Patent Number: 4,954,375
[45] Date of Patent: Sep. 4, 1990

[54] VIBRATION DAMPING APPARATUS

[75] Inventors: Stanley S. Sattinger, Mount Lebanon, Pa.; Leo K. H. Lu, Cupertino; Jerry R. Smerecky, Sunnyvale, both of Calif.

[73] Assignee: Westinghouse Electric Corp., Pittsburgh, Pa.

[21] Appl. No.: 290,395

[22] Filed: Dec. 29, 1988

[51] Int. Cl.$^5$ ............................................. E04B 1/84
[52] U.S. Cl. .................................... 428/34.1; 52/144; 52/309.1; 52/403; 428/36.9
[58] Field of Search ............... 52/144, 145, 309.1, 52/309.6, 397.7, 403; 428/34.1, 36.9, 134

[56] References Cited

U.S. PATENT DOCUMENTS

| 3,078,969 | 2/1963 | Campbell et al. | 52/403 |
| 3,078,971 | 2/1963 | Wallerstein, Jr. | 52/403 |
| 3,402,560 | 9/1968 | Alm | 52/144 |
| 4,425,980 | 1/1984 | Miles | 52/403 |
| 4,527,371 | 7/1985 | Hagbjer | 52/309.16 |

Primary Examiner—James Seidleck
Attorney, Agent, or Firm—D. Schron

[57] ABSTRACT

A hollow beam structure such as a machinery subbase having apertures in sidewall portions thereof has a plurality of shear damper assemblies which straddle the apertures and are fastened to the wall portion on opposite sides of the apertures. The shear damper assemblies include a viscoelectric damping layer which dissipates vibrational energy to minimize the vibrational response of the hollow beam structure.

9 Claims, 5 Drawing Sheets

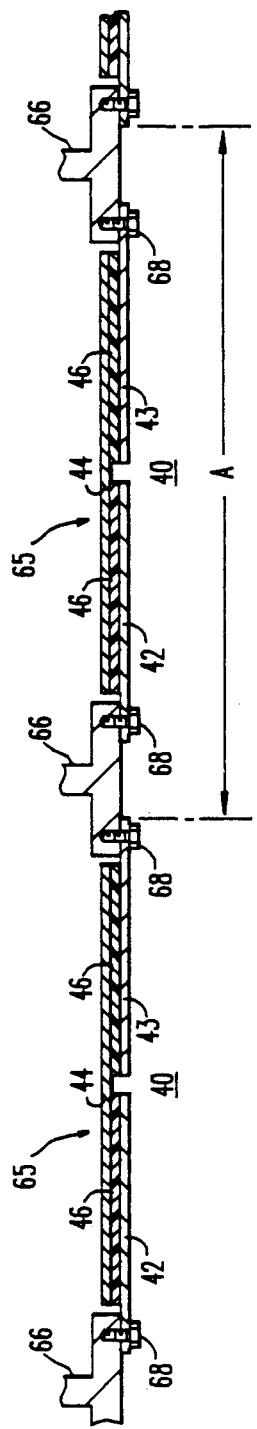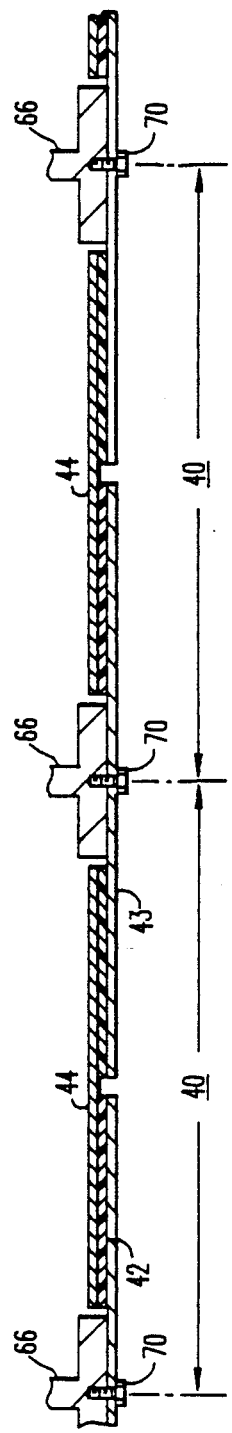

VIBRATION DAMPING APPARATUS

BACKGROUND OF THE INVENTION

1. Field of the Invention:

The invention in general relates to hollow beam structures and particularly to an arrangement for damping induced vibrational energy therein.

2. Background Information

Various types of support structures are subject to vibrational responses during operation including low frequency modes characterized by cyclic torsional and bending deformations of the structure members.

A common type of support structure is formed of hollow beam members having apertures for weight reduction or access, and if unbalanced forces or other sources of excitation are applied at frequencies close to the natural frequencies of the low order modes, unwanted vibrations can occur. Various conventional techniques of minimizing these vibrations exist and include for example a free layer damping treatment wherein a plastic tile is applied directly on the surface of the members subject to vibration. In another technique, known as constrained layer damping, a viscoelastic damping polymer film is sandwiched between the base member to be damped and an outer plate.

In the present invention, low order vibration responses are attenuated by a damping arrangement which, for a given amount of added weight, is substantially more effective than conventional damping treatments.

SUMMARY OF THE INVENTION

A vibrationally damped structure in accordance with the present invention includes a hollow beam structure which has a plurality of wall portions and is subject to unwanted vibrational excitation. At least one of the wall portions includes a plurality of apertures therethrough and a plurality of shear damping assemblies are provided, with each shear damping assembly extending across a respective one of the apertures and being secured to the wall portion on opposite sides of the aperture.

The shear damping assembly in one embodiment includes first and second generally coplanar plate members with a third plate member overlapping the two and which includes a viscoelastic damping layer sandwiched between the third plate member and the first and second plate members. With this arrangement, the first and second generally coplanar plate members are fixed to the wall portion across the aperture.

In another embodiment, the shear damping assembly includes first and second plates with a viscoelastic damping layer sandwiched between them with the first and second plates being respectively secured on opposite sides of the aperture. The hollow beam structure, by way of example, forms a portion of a machinery subbase which includes a plurality of hollow beam structures arranged in various leg segments to support a machine which generates vibrational energy.

BRIEF DESCRIPTION OF THE DRAWINGS

FIG. 7 is a general view along line VII—VII of FIG. 6;

FIG. 8 is a view similar to FIG. 7 illustrating an alternative mounting of the damper assembly;

DESCRIPTION OF THE PREFERRED EMBODIMENTS

Figure 1:
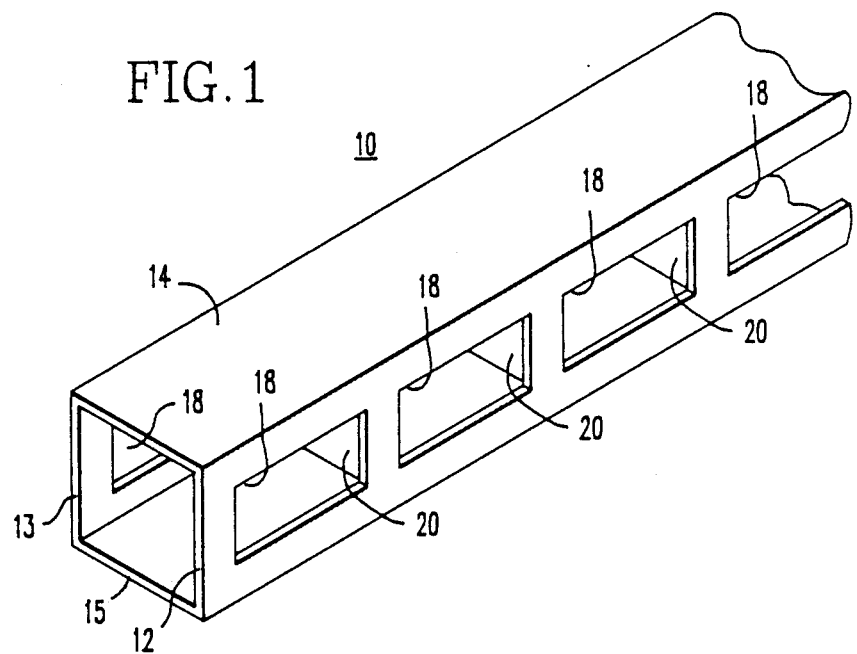
FIG. 1 illustrates a hollow beam member.

Referring now to FIG. 1, there is illustrated a hollow beam structure 10 which, by way of example, is of a rectangular cross-section and includes a plurality of wall portions 12 to 15. Wall portions 12 and 13 constitute sidewalls and include a plurality of apertures 18 provided to reduce the overall weight of the structure as well as to serve as access apertures for certain large hollow beam structures, to be described. The wall portions 12 to 15 are relatively thin, and in order to effectively increase the load bearing capability of the structure, there may be provided a plurality of stiffener members or ribs 20 disposed along the length of the hollow beam structure internally thereof.

Figure 2:
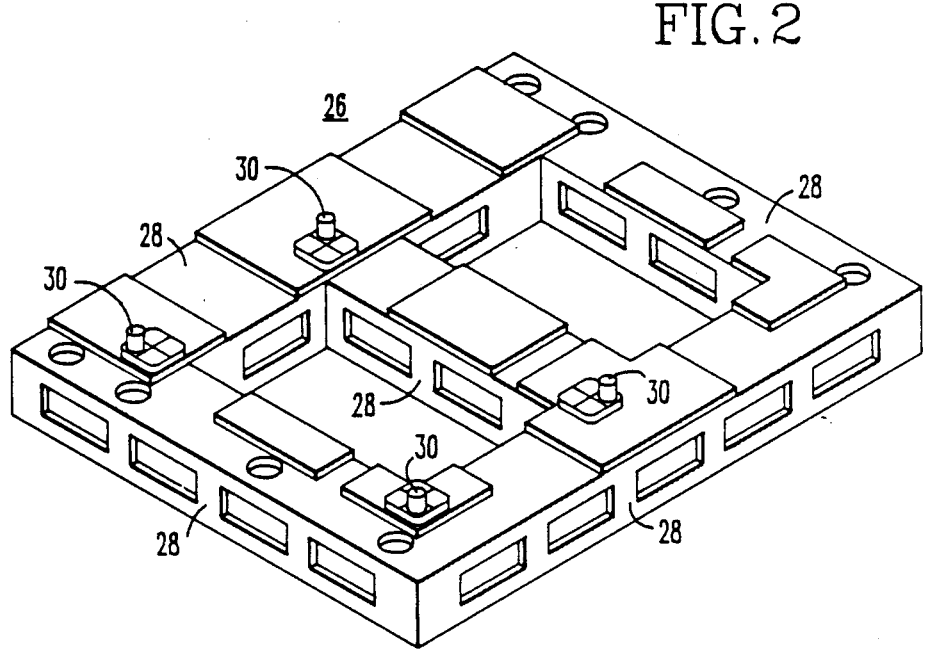
FIG. 2 illustrates a machinery support formed of hollow beam members.

FIG. 2 illustrates a structure 26 utilized for supporting machinery and includes a plurality of leg segments 28 formed of hollow beam members such as illustrated in FIG. 1. In its function as a machinery support, structure 26 is commonly known as a machinery subbase which includes isolation mounts, a few of which, 30, are illustrated and which serve to partially isolate the vibrational energy of the supported machinery from the subbase and from the floor on which the subbase is mounted. In the case of marine vessels, the floor would be a deck of the vessel in which case the transfer of vibrational energy from the machinery to the surrounding water medium must be minimized.

Figure 3:
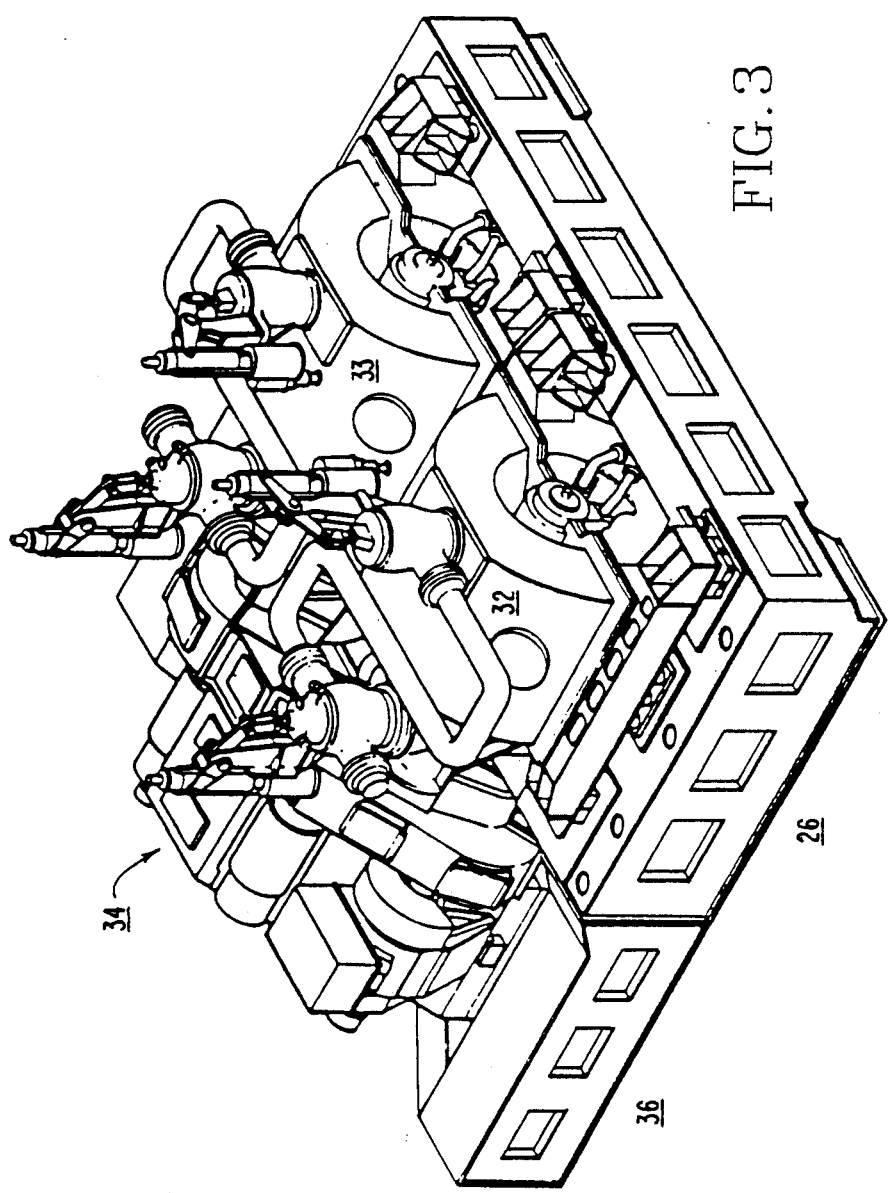
FIG. 3 illustrates a support such as illustrated in FIG. 2 together with the supported machinery.
Figure 4:
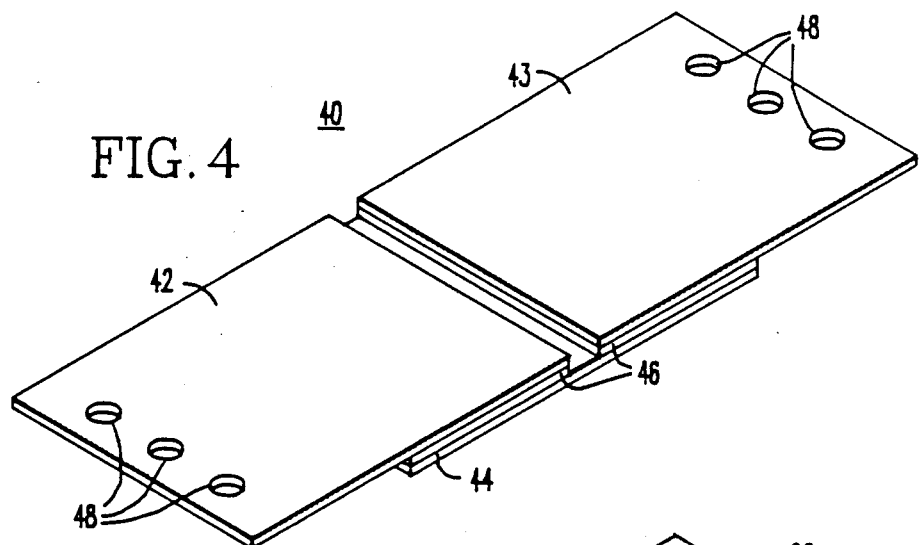
FIG. 4 illustrates one type of damper assembly which may be utilized therein.

A typical example of marine use is illustrated in FIG. 3 wherein subbase 26 supports turbines 32 and 33 which drive reduction gearing apparatus 34, with the latter apparatus being mounted on its own subbase 36. Even with the provision of isolation mounts, the machinery subbase may be subject to unwanted vibrational excitation such that the subbase vibrations must be damped in order to minimize the level of response. In the present invention, the method of damping is provided by shear damping assemblies, one of which 40, is illustrated in FIG. 4.

The shear damping assembly 40 includes the first and second generally coplanar plates 42 and 43 bridged, or overlapped, by means of a third plate 44. Sandwiched between this latter plate 44 and the first and second plates 42 and 43 is a viscoelastic damping polymer layer 46, one example of which is Dyad 606 produced by the Soundcoat Company. The damper assembly 40 is placed across an aperture of a hollow beam structure and secured thereto by means of fasteners received in holes 48.

As the hollow beam member distorts due to vibrational excitation, each plate 42 and 43 has a load applied to it, for example, in tension, compression, and bending and the load applied to these plates 42 and 43 is transferred through the viscoelastic damping layer 46 to plate 44. As a result of this load transfer, shear stress is put into the viscoelastic damping layer resulting in shear strain and the consequent absorption and dissipation of energy. With the structure of FIG. 4, the full load that is applied to the plates 42 and 43 is transmitted through the viscoelastic material, and this is the condition in which the maximum amount of strain or vibrational energy is consumed.

Figure 5:
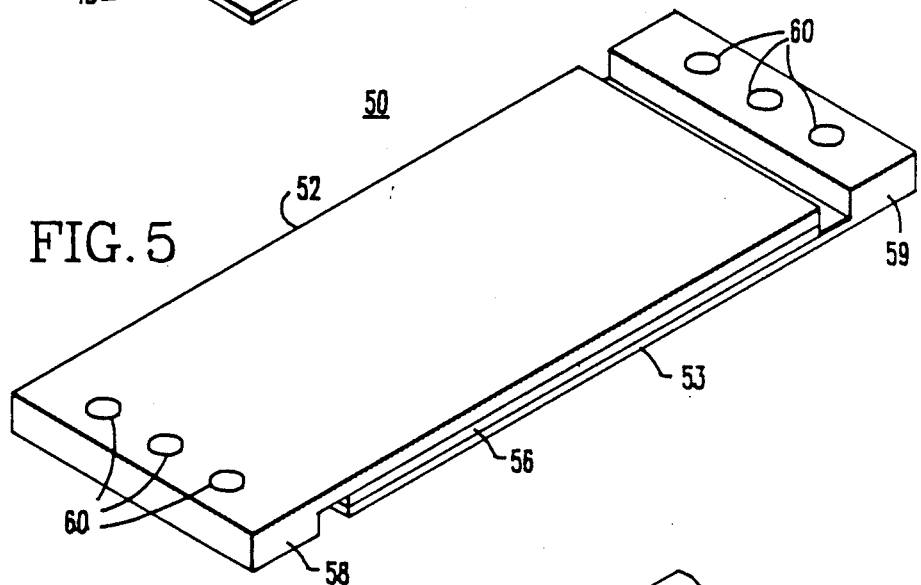
FIG. 5 illustrates another type of damping assembly which may be utilized herein.

An alternate form of shear damper assembly which may be utilized herein is illustrated in FIG. 5. The shear damper assembly 50 includes a first plate 52 which overlaps a second plate 53 with the arrangement including a viscoelastic damping layer 56 sandwiched between the two plates. Respective enlarged end sections 58 and 59 include holes 60 for mounting purposes. The operation of the damper assembly 50 is identical to the damper assembly 40 in that any load applied to plates 52 and 53 will be transferred through the viscoelastic damping layer 56 which results in an absorption of vibrational energy present in the structure to which the plates are connected.

Figure 6:
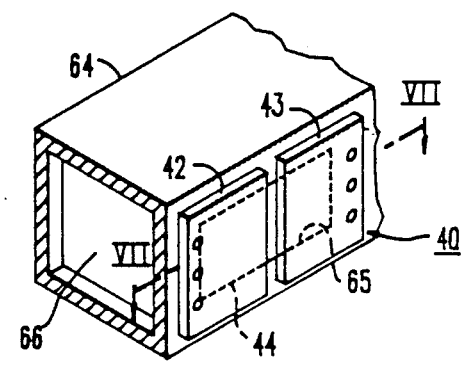
FIG. 6 illustrates one bay of a hollow beam structure together with the damping assembly of FIG. 4.

FIG. 6 illustrates a vibrationally damped structure and includes a hollow beam member 64 of the type described in FIG. 1, a small section of which is illustrated to demonstrate the principle. The section 64 includes an aperture 65 bridged by a shear damper assembly 40 as previously described in FIG. 4, and connected to the hollow beam structure 64 on opposite sides of aperture 65. One of a plurality of ribs 66 is also illustrated.

FIG. 7 represents a sectional view through a portion of the hollow beam member 64 and zone A generally represents a view along the lines VII—VII of FIG. 6. In FIG. 7, two FIG. 4 damper assemblies 40 are illustrated as being connected across two adjacent apertures 65. The individual damper assemblies 40 are secured to the wall portion of hollow beam member 64 by means of fasteners 68 passing through holes (48 in FIG. 4) in respective plates 42 and 43. If the hollow beam structure forms part of a machinery subbase as it has in FIGS. 2 or 3, apertures 65 may function as access apertures in which case the damper assemblies 40 are readily removable from the wall portion to permit entry to the central area of the subbase.

An arrangement such as illustrated in FIG. 8 may be also utilized. FIG. 8 is similar to FIG. 7, however, each of the outer plates 42 or 43 secured by means of fasteners 70, forms one of the two coplanar plates for two adjacent damper assemblies 40. That is, although the damping structure across all of the apertures may be removed as a single entity in view of the overlapping arrangement, a damping structure across an aperture is considered herein to be a damping assembly 40, each of which extends between the dot-dash lines of FIG. 8. With the embodiment of FIG. 8, fewer fasteners may be utilized.

Figure 9:
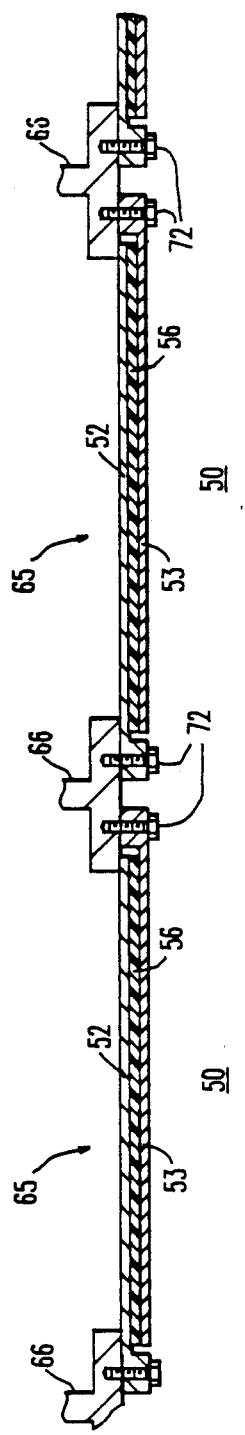
FIGS. 9 and 10 are views similar to FIGS. 7 and 8, however with the damping assembly of FIG. 5.

FIG. 9 is a view similar to FIG. 7, however, with a shear damper assembly 50 of FIG. 5 being utilized and secured to the wall of the hollow beam member on either side of aperture 65 by means of fasteners 72. In like manner, FIG. 10 is similar to FIG. 8 with the elongated plate version of damper assembly 50 secured by means of fasteners 74.

Figure 10:
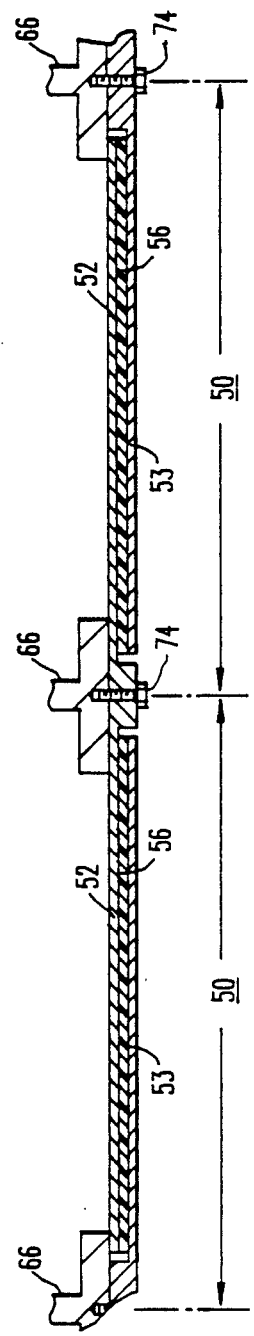

The damper arrangements of FIGS. 7 and 8 may be preferable to those illustrated in FIGS. 9 and 10 insofar as the three plate damper assembly may be mounted with the third plate 44 within the aperture 65 to present a unit which is more flush with the wall surface than would be the damper assemblies 50 of FIGS. 9 and 10. With the arrangements of FIGS. 7 and 8, the eccentricity of the forces applied to the plates would be minimized resulting in improved damper effectiveness.

Figure 11:
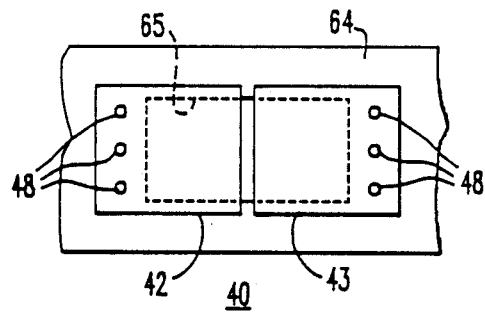
FIG. 11 is an elevational view of the bay illustrated in FIG. 6.

FIG. 11 is a front view of the arrangement illustrated in FIG. 6, and FIGS. 11A to 11C serve to illustrate the vibrational deformation of the hollow beam member 64 and the resultant displacements of the shear damper assembly plates 42 and 43. The shear damper assembly 40 is attached to the wall of the hollow beam structure 64 on opposite sides of aperture 65 by means of fasteners extending through holes 48 in plates 42 and 43. These fasteners prevent both translation and rotation of the plates relative to the aperture sides.

Figure 11A:
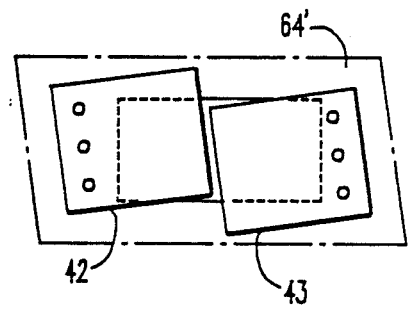
FIGS. 11A through 11C serve to illustrate the vibrational distortion of the damper assembly shown in FIG. 11 for various types of energy dissipation.

The dot-dash parallelogram 64' of FIG. 11A represents the deformation of hollow beam 64 in response to a torsional vibration. In response to such torsional vibration, first and second plates 42 and 43 are displaced relative to the third plate (not illustrated) and as a result of such displacement, the torsional energy is dissipated in the viscoelastic damping layer. It is to be noted, that the distortion shown in FIGS. 11A to 11C is greatly exaggerated for purposes of illustration.

Figure 11B:
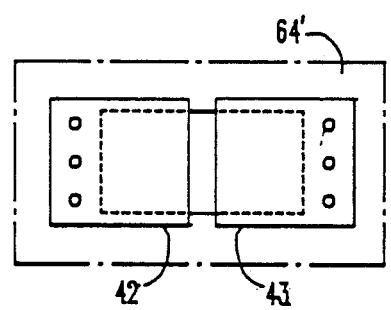

FIG. 11B represents a lateral bending or bowing response to a particular vibrational excitation. The section 64 ' is bowed outwardly toward the viewer resulting in a separation of plates 42 and 43, with a consequent transfer of load and a resulting shear strain and energy dissipation in the viscoelastic layer.

Figure 11C:
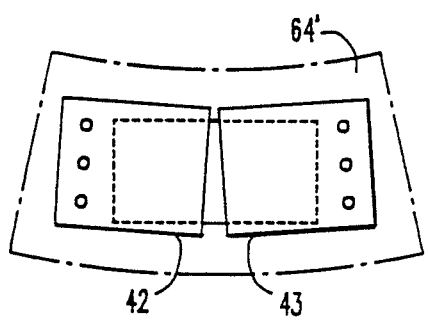

FIG. 11C represents a vertical bending response to vibrational excitation wherein the paltes 42 and 43 rotate relative to one another to initiate the energy dissipation process previously described.

Figure 12:
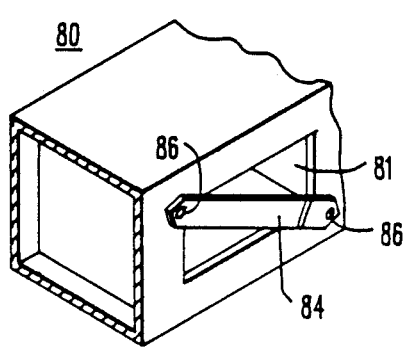
FIG. 12 illustrates an alternate damping arrangement.

In the apparatus thus far described, the plates of the shear damper assemblies connected across the apertures of a hollow beam member are relatively wide. FIG. 12 illustrates another embodiment of the invention wherein the shear damper assembly plates may be relatively narrow thereby forming a damper strut. By way of example, a portion of a hollow beam structure 80 is illustrated having an aperture 81 therein. A shear damper assembly 84 for example of first and second plate construction as in FIG. 5 is diagonally connected across aperture 81 and secured to the wall portion of the hollow beam structure by means of fasteners 86, one at either end of the strut damper assembly. The single fastener at each end allows small relative rotations to occur between the strut and the structure 80 and allows for effective damping of torsional vibration, although such strut structure would be less efficient for other types of bending deformations.

We claim:
1. A vibrationally damped structure, comprising:
A) a hollow beam structure having a plurality of wall portions;
B) at least one of said wall portions including a plurality of apertures therethrough;
C) a plurality of shear damping assemblies operable to absorb energy from unwanted vibrational excitation, with each said shear damping assembly including a plurality of plate members and which extends across a respective one of said apertures with a first said plate member being secured to said wall portion on one side of said aperture and a second said plate members being secured to said wall portion on an opposite side of said aperture.

2. The structure according to claim 1 wherein said first and second plate members in each said damping assembly are generally coplanar and there is a third plate member which overlaps said first and second members, with a viscoelastic damping layer sandwiched between said third plate member and said first and second plate members.

3. The structure according to claim 2 wherein:
A) said hollow beam structure has a rectangular cross section.

4. The structure according to claim 2 wherein:
A) said hollow beam structure forms a portion of a machinery subbase which includes a plurality of said hollow beam structures arranged in a plurality of leg segments to support a machine which generates vibrational energy.

5. The structure according to claim 2 wherein:
A) said third plate of said shear damper assembly is disposed within the aperture across which each said shear damper assembly extends.

6. The structure according to claim 1 wherein said second plate member in each said damping assembly overlaps said first plate member, and there is a viscoelastic damping layer sandwhiched between said first and second plate members.

7. The structure according to claim 6 wherein:
A) said hollow beam structure has a rectangular cross section.

8. The structure according to claim 6 wherein:
A) said hollow beam structure forms a portion of a machinery subbase which includes a plurality of said hollow beam structures arranged in a plurality of leg segments to support a machine which generates vibrational energy.

9. The structure according to claims 2 or 6 wherein:
A) said plate members are relatively narrow such that each said shear damping assembly is in the form of a strut.

* * * * *